(No Model.) 9 Sheets—Sheet 1.

J. S. DAVIS.
HARVESTER.

No. 388,765. Patented Aug. 28, 1888.

Fig. 1.

Witnesses
Geo. W. Young
Henry A. Lamb

Inventor
John S. Davis.
By his Attorneys
Jaunus and Skinkle

Fig. 2.

(No Model.)
9 Sheets—Sheet 3.

J. S. DAVIS.
HARVESTER.

No. 388,765. Patented Aug. 28, 1888.

Fig. 3.

Witnesses,
Geo. W. Young
Henry A. Lamb

Inventor,
John S. Davis,
By his Attorneys (No Model.) 9 Sheets—Sheet 4.

J. S. DAVIS.
HARVESTER.

No. 388,765. Patented Aug. 28, 1888.

Witnesses,
Geo. W. Young.
Henry A. Lamb.

Inventor
John S. Davis.
By his Attorneys
Jannus and Srinkle (No Model.) 9 Sheets—Sheet 5.
J. S. DAVIS.
HARVESTER.

No. 388,765. Patented Aug. 28, 1888.

Fig. 5.

Witnesses,
Geo. W. Young.
Henry A. Lamb.

Inventor.
John S. Davis.
By his Attorneys

UNITED STATES PATENT OFFICE.

JOHN S. DAVIS, OF CLEVELAND, OHIO, ASSIGNOR TO ADIEN E. SUMNER, OF SAME PLACE.

HARVESTER.

SPECIFICATION forming part of Letters Patent No. 388,765, dated August 28, 1888.

Application filed March 7, 1885. Renewed July 5, 1887. Serial No. 243,446. (No model.)

*To all whom it may concern:*

Be it known that I, JOHN S. DAVIS, a citizen of the United States, residing at Cleveland, in the county of Cuyahoga and State of Ohio, have invented certain new and useful Improvements in Harvesters, of which the following is a specification, reference being had to the accompanying drawings.

My invention has for its object the improvement of grain-binding harvesters of the class known as "platform-binders," in which the grain is gaveled and bound on or substantially on the level of the platform in rear of the main wheel; and it relates to the general construction of the harvester-frame with the view of adapting it to carry and operate a binding mechanism to be suitably mounted thereon outside of the main wheel, (the said mechanism being the subject of another application filed by me May 28, 1885, Serial No. 166,849, and for this reason is not fully described and claimed herein;) to the method of supporting it on the axle of the main wheel and adjusting it vertically thereon or rocking it thereabout; to supporting the grain end of the platform on a caster-wheel on which it may be vertically adjusted, said adjustment being effected by the driver from his seat simultaneously with or independently of the vertical adjustment of the frame upon the axle of the main wheel; to mounting the driver's seat in such a manner that his weight will assist in raising and lowering the frame on the axle of the main wheel, and to suitable mechanism for effecting these objects.

The accompanying drawings represent the application of my improvements to a harvester in the best form now known to me. Some of these improvements may, however, be used without the others and in machines differing in some respects from that shown and hereinafter particularly described, and the details of construction may be modified in various ways without departing from the spirit of my invention.

The main frame A, which surrounds the driving-wheel B, is preferably composed of a single piece of flat bar-iron suitably bent to form a rectangle, the space within which is divided by a longitudinal bar, A', which forms part of the frame, bracing and strengthening it. Beginning at a point at the outer rear corner of the frame, the bar composing it is bent to form a foot, $a$, from which it proceeds across the back $a'$, up the inner side, $a^2$, across the front $a^3$, and down the outer side, $a^4$, to the foot $a$, to which it is secured by a bolt, as shown.

The brace A' is provided at each end with side foot projections, $a^5$ $a^6$, by which it is suitably secured to the front and back bars of the frame A by bolts or rivets. The bar $a^4$ is slightly bent edgewise near the point where it is connected to the foot $a$, and from this bend it proceeds horizontally across the outer end of the platform to the rear sill-piece thereof, where it is bent inwardly at a right angle and terminates in a foot, $a^7$, which is securely bolted to the rear sill, D, of the platform. The finger-beam and front sill of the platform consist of a bar of angle-iron, C, the widest side of which forms the vertical front face of the beam, while the narrower portion extends rearwardly from its bottom to form the base. At a point near its juncture with the main frame this bar is twisted, as shown at $c$, to bring its front face to an angle that will conform to the angle of the main frame, against the back bar, $a'$, of which it lies and is securely bolted, as shown.

A brace-bar, A², is secured flatwise beneath the bottom flange of the finger-beam at a point beyond the main frame and about in line with the first guard-finger, beneath which it lies and about the point of which it is twisted, as shown, to form a guard or shoe. From this twist the bar proceeds diagonally and up until it reaches a point in line with the front bar, $a^2$, of the main frame, where it is bent and extends across the entire front of the frame, terminating in a forwardly-projecting foot, $a^8$, and secured to the front bar of the frame by several bolts, as shown.

A flat brace-bar, D', is bolted to the under side of the finger-beam about midway of its length and extends back diagonally beneath the bottom of the platform to a point near its outer corner, where it terminates in a casting, D², having an upwardly-projecting foot, by which it is secured to the rear sill, D, by a bolt, $d$, which passes through the casting, the foot $a^7$ of the extension-bar, and the rear sill. This brace greatly strengthens the platform against the strains and backward thrusts met by it at the divider end, and also helps to sustain such of the bottom boards as may rest upon it. A cast metal bracket, E, of peculiar shape, is securely bolted to the extreme end of the finger-beam by four bolts, two of which pass through the bottom flange of the finger-beam and a corresponding foot, $e'$, at the bottom of the casting, while the other two pass through the front upright portion of the finger-beam and the vertical face of the casting. This casting consists of a central upright portion or breast, E, which has at its outer edge a forwardly-projecting flange, E', to which the divider-board C' is attached, and at or near its inner edge a rearwardly-projecting flange, E², to which the end-board C² of the platform is securely bolted, as shown.

At the inner rear corner of the platform the end-board projects beyond the rear sill, as shown in Figs. 1, 2, 7, 8, and the vertical post D³, which carries the overhanging support for the inner end of the reel-shaft, is securely bolted to this projecting portion of the end-board. A bracket or casting, D⁴, is securely bolted to the post D³ and to the rear sill, D, of the platform, and assists in forming a very strong and rigid connection at this corner. To prevent the rear side of the platform from drooping or sagging under the weight of the binding mechanism before mentioned, which I propose to mount thereon near the outer end, or from springing under the strains and jars to which it may be subjected in going over rough ground, I truss-brace the bar $a^4$. A strut, $d'$, has an overhanging lip or ledge which rests upon the bar $a^4$, and is secured to it by the bolt $d^2$, which unites the bar to the foot $a$. At proper distance along the bar $a^4$, on each side of this strut, are bolted castings $d^3$, having projecting lugs or ears, which stand at an angle to their bases and are perforated for the passage of a tie or truss rod, $d^4$. This rod lies in a suitable recess or aperture at the top of the strut $d'$. The rod is screw-threaded at each end and provided with adjusting-nuts which bear upon the outer faces of the projecting lugs on the castings $d^3$, and impart any desired tension to the rod. A shoe or casting, $C^3$, is securely bolted to the front face of the finger-bar between the main frame and the brace-bar $A^2$, but nearer the latter, to which it is also bolted at its front end, being suitably shaped and flanged for this purpose. (See Figs. 1, 3, 4.) This casting serves to support and guide the heel of the cutter-bar, and at a suitable point in advance of the finger-beam it is provided with a socket, $c^3$, in which the foot of the reel-post $C^4$ is bolted. This reel-post is braced in its upright position by brace-rods $c^4$ $c^5$, the former being bolted to the brace-bar $A^2$ and the latter to a casting, $A^3$, which is part of the binder-frame, before referred to, and is mentioned and shown in this application because it affords a convenient point of attachment for the brace-rod $c^5$ and a bearing for the shaft which drives the carrier-belts and sway-bar, to be hereinafter described.

The casting $A^3$ is bolted by its downwardly-projecting feet to the bars $a^4$ and $A'$ of the main frame, and helps to stiffen and strengthen it at this point. It will be seen that the main frame and platform, as thus described, are rigidly united and constitute a very strong and light structure, well adapted for the purpose for which it is designed. It is supported by and capable of vertical adjustment upon a large driving-wheel located within the main frame A and a caster-wheel at the inner end of the platform, proper mechanism for effecting the adjustments of the ends being within the reach and under control of the driver, as will presently be described. Attached to the front bar of the frame A, at a point best adapted to correct side draft, &c., is a bracket, F, provided with forwardly-projecting ears or lugs $F'$ $F^2$, between which the heel of the tongue G is pivoted on a bolt, $f$. A brace-bar, $G'$, is secured to the tongue at a proper distance in advance of its heel-connection, and extends diagonally to the outer front corner of the main frame, where it is pivotally connected to the forwardly-projecting foot $a^8$ of the brace-bar $A^2$, before described. This pivot is in axial line with the pivot-bolt $f$ at the heel of the tongue, so that the frame and tongue may be freely rocked without cramping.

A foot board, $G^2$, is bolted to the top of the tongue, and extends across the front of the machine, being supported by an angle-bracket, $g$, which is bolted to the brace-bar $G'$. The lug $F'$ of the bracket F extends forward farther than the lug $F^2$, and terminates in a segmental gear-rack, $f'$. A bracket, $F^4$, is bolted to the side of the tongue at a proper distance in advance of this rack, and has pivoted upon it a hand-lever, $F^5$, which is provided at its lower end with a segmental rack which meshes with the rack $f'$ on the lug $F'$. The bracket $F^4$ has notches along its upper edge, into which a sliding detent, $f^5$, on the hand-lever drops to lock the lever in its adjusted position. By means of this lever and the segmental racks, as just described, the relative angles of the tongue and the main frame may be altered at pleasure, the main frame rocking upon its supporting-shaft, and thereby to a certain extent raising or lowering the cutter-bar and changing the angle at which it is presented to the work.

As before stated, the space within the main frame is divided longitudinally by the brace-bar $A'$, and in the larger of the two spaces thus formed is placed the driving-wheel B, bushed with steel and loosely mounted upon its shaft $B'$, so as to revolve freely thereon.

A spur gear wheel or ring, $b'$, is cast upon or fastened to the spokes of the driving-wheel in any suitable manner and meshes with a spur pinion, $b^2$, on a driving-shaft, $B^2$, which transmits motion to the harvesting and binding mechanism. This shaft is supported in overhanging sleeve-bearings $b^3$ of a bracket, $B^3$, having downwardly-projecting flanges securely bolted to the frame-bars $A'$ $a^4$, and is recessed to form the lower half of a box or gear casing, in which a beveled wheel and pinion, $B^4$ $b^4$, work.

Attached to the adjacent bars $A'$ $a^2$ of the main frame, at each side of the driving-wheel, are curved upright yokes H H', provided with segmental gear-racks $h$ $h'$ on their inner front faces. The main shaft $B'$ passes through these yokes, and has keyed to it spur-pinions $h^2$ $h^3$, which take into the racks, and when revolved raise or lower the frame on the shaft, the proper relation of all the parts being maintained during such adjustments by the yokes, which embrace the hubs of the pinions, holding them in gear with the racks and preventing any but the proper vertical movement of the frame. These yokes are curved to a radius struck from the center of the driving-shaft $B^2$, in order to maintain the proper relationship between the spur-wheel $b'$ and the pinion $b^2$ throughout the range of vertical adjustment of the frame. The yokes terminate at their lower ends in broad flanges or base-plates, which extend along the adjacent bars $A'$ $a^2$ and are securely bolted thereto. Overhanging ledges at the tops and bottoms of the base-plates closely embrace the frame-bars and aid the bolts in making firm connections.

Each yoke is formed with two distinct recesses or tracks within it, the outer and narrower one, $h^4$, which constitutes the slot proper, being of a width to snugly embrace the hub of the pinion which projects through it, while the inner and wider one, $h^5$, which is provided on its front inner face with the gear-teeth, is of such a width as to receive the geared portion of the pinion, which engages with the rack and permits it to revolve freely in its up and down movements.

Figures 11, 12, 13, 14, 15, 16, 17, 18, 19, 20, 21, 22, 23, 24:
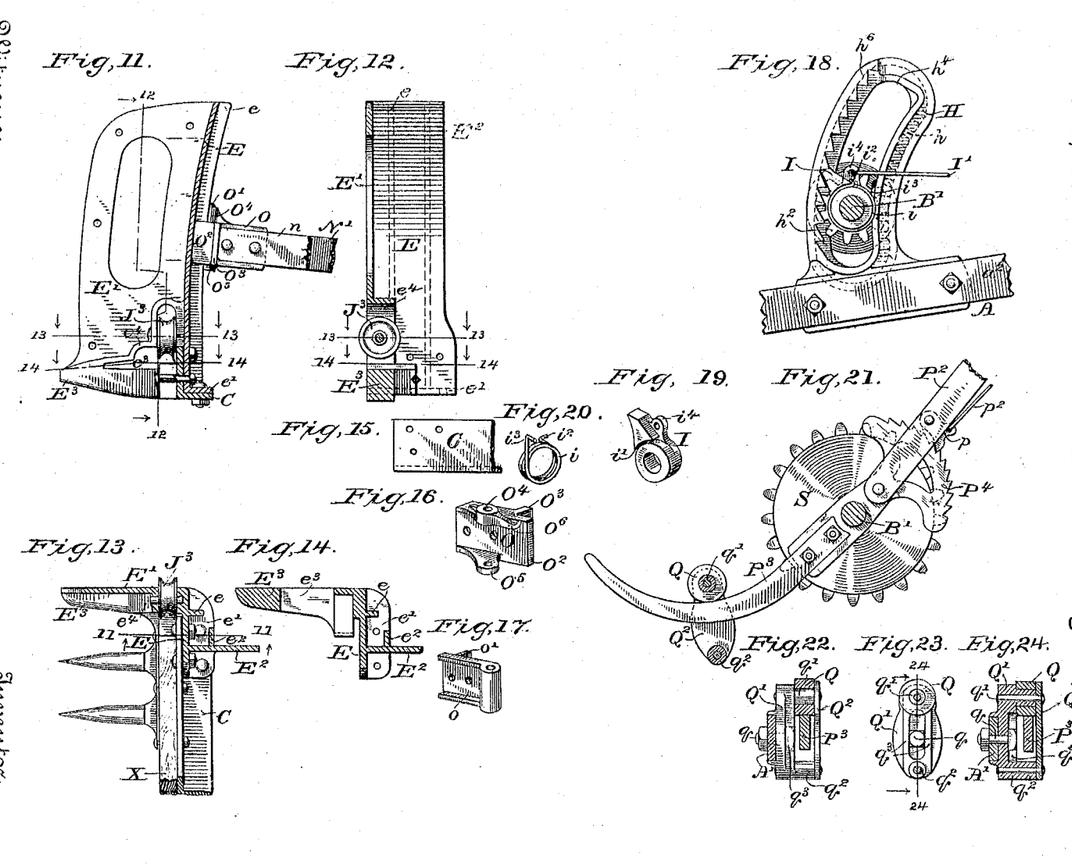
Fig. 11 is an elevation of the same as seen from the opposite side to that shown in Fig. 9, and is partly in section on the lines 11 11 of Figs. 10 and 13.
Fig. 12 is an elevation in section on the line 12 12 of Figs. 9 and 11.
Fig. 13 is a horizontal section on the lines 13 13 of Figs. 11 and 12.
Fig. 14 is a similar section on the lines 14 14 of Figs. 11 and 12.
Fig. 15 is a view of a short piece of the end of the finger-bar to which the bracket shown by the preceding figures is bolted, and it is placed directly under the position it would occupy in Fig. 12. In other words, if it were lifted until the bolt-holes shown in it registered with those shown in the bracket in Fig. 12 it would be in proper position to be bolted thereto.
Fig. 16 is a perspective view of the bracket or caster head-block to which the caster-wheel is pivoted.
Fig. 17 is a similar view of a casting to be riveted to the end of the caster-wheel arm and pivoted between the overhanging lugs on the head-block shown in Fig. 16.
Fig. 18 is a view in elevation of the inner yoke and its racks, by means of which the frame is adjusted vertically on the axle of the driving-wheel, and by which it is guided during adjustment and is firmly held at any desired elevation.
Fig. 19 is a perspective view of the dog or pawl to be loosely mounted on the main axle and engage with the proper rack on the yoke to sustain the weight of the machine, as clearly shown by Fig. 18.
Fig. 20 is a perspective view of a spiral spring which is wound about the hub of the sustaining-pawl and forces it into engagement with the rack of the yoke.
Fig. 21 is a view, partly in elevation and partly in section, on the line 21 21 of Fig. 4, showing the lower portion of the seat-supporting standard.
Fig. 22 is a view, partly in elevation and partly in section, of the stirrup which is attached to the side bar of the main frame and guides the lower end of the seat-supporting standard.
Fig. 23 is a view in elevation of the same, the inner guard-plate being removed and the bolts which hold it shown in section.
Fig. 24 is a vertical central section of the same on the line 24 24 of Fig. 23.

The pinions are provided on their inner faces with flanges, which project beyond the ends of the teeth and bear against the adjacent faces of the yokes and hold the shaft against endwise movements through them. In addition to the two tracks or recesses just described, the yoke H is provided on its outer side with the projecting flange $h^6$, having a series of ratchet-teeth on its front face, which are engaged by a spring-pawl, I, loosely mounted on the shaft and sustaining the frame at any elevation to which it may be adjusted. The pawl is held into engagement with the rack by a spring, $i$, the nose of the pawl being partially undercut across the hub to form a recess, $i'$, in which the spring lies. The spring is provided at one end with a hook, $i^2$, which catches over the overhanging ledge of the recess. It is then wound twice around the hub and terminates in a projecting arm, $i^3$, which extends at right angles to the coil and bears against the face of the slot $h^4$ in the yoke, slipping up and down thereon, as the machine is adjusted on the shaft, as will be seen by Fig. 18. The face of the slot against which the spring-arm bears extends upward far enough to form a corner, and permits the full range of adjustment of the frame without cramping the spring. The pawl has a perforated lug, $i^4$, on its upper side, in which is secured the link I′, which connects the pawl to a sliding bolt, I², on the foot-board. This bolt is held in place by a suitable guideway, I³, consisting of two side bars secured to the foot-board by screws or otherwise and connected together at their front ends by a bridge, I⁴, beneath which the bolt plays back and forth. In adjusting the frame vertically on the shaft, or in rocking it thereon, the distance between the pawl I and guideway I³ on the foot-board varies, and I compensate for this by giving the bolt I² a greater range of movement than is necessary to withdraw the pawl from the ratchet, and allow it to play freely back and forth in its guideway during the adjustments of the frame without withdrawing the pawl from the ratchet.

If preferred, the guide-bars between which the bolt slides might be independent and have beveled inner edges, which would overlap dovetailed edges on the bolt, to hold it down, instead of the bridge shown in the drawings; but I do not regard this as material, for any suitable guideway giving the bolt sufficient range of movement will answer.

As will be understood from the foregoing description, the main frame is raised and lowered on the axle by means of the pinions $h^2 h^3$, keyed fast to it, engaging in the yoke-racks attached to the frame, and it is held at any desired elevation by the spring-pawl I taking into the ratchet $h^6$ on the yoke H. The inner or grain end of the platform is vertically adjustable on the grain-wheel which supports it, said adjustment being maintained and brought within the reach and control of the driver in his seat by a wire rope or other suitable flexible connection, J, extending along the front of the finger-beam around a guide-sheave, J′, to a winding-drum, J², on the main shaft.

The drum is loosely mounted upon the shaft beside the yoke H, by which it is held from endwise movement in one direction, while a collar, $j$, lying in an undercut recess in the outer end of the drum and keyed fast to the shaft, prevents movement in the other. A reduced hub, $j'$, on the inner end of the drum is encircled by the end of the hand-lever K, for which it acts as a pivot. An enlarged flange, $j^2$, also at this end of the drum, is provided with ratchet-teeth on its periphery, which are engaged by a pawl, $k$, on the hand lever. At its outer or recessed end the face of the drum is provided with an angular flange, notched to form a series of clutch-teeth, $j^3$, which interlock with a similar series, $l^3$, on the face of a collar, L, on the end of the shaft. This collar constitutes the sliding member of the clutch and has longitudinal slots $l$, into which the ends of a cross-pin, $l'$, secured in the shaft, project and compel the shaft and collar to rotate together, but permit of endwise movement of the latter. A lever, M, is pivoted between the arms of a bracket, $m$, secured to the lever K, and encircles the hub of the sliding member of the clutch, lying in a circumferential groove formed by the flange $l^3$ on one side and a collar, $l^2$, keyed fast to the hub on the other. A spring, $m'$, exerts a constant pressure on the lever, tending to keep the clutch-halves $j^3 l^3$ interlocked with each other. The handle of the lever M is bent in toward the lever K to bring it within grasping distance of the handle on said lever, which latter is further provided with a finger-latch, $k'$, connected by a link-rod, $k^2$, to the pawl $k$. The link passes through a perforation in a lug, $m^2$, projecting from the bracket $m$, and is encircled by a spiral spring, $k^3$, between the lugs and the pawl $k$, which tends by its expansive force to keep the latter into engagement with the ratchet-teeth $j^2$ on the flange of the drum. By means of these levers and the mechanism just described the main frame and the inner end of the platform may be raised and lowered simultaneously, or the inner end of the platform may be adjusted independently of the main frame. When both ends of the machine are to be raised together, the lever K is rocked upon its pivot and its pawl $k$, engaging with the teeth $j^2$ of the drum, causes it to revolve and wind up the wire rope J, leading from the caster-wheel support of the grain end of the platform, lifting that end in a manner and by mechanism which will hereinafter be described in detail. The clutches $j^3 l^3$ being interlocked, the sliding collar L rotates with the drum, and by means of its cross-pin connection compels the rotation of the shaft B′, to which the pinions $h^2 h^3$ are keyed, causing them to move over the racks in yokes H H′, and thereby lift the frame. The sustaining-pawl I clicks over the ratchet $h^6$ while the frame is going up; but it must be held out of engagement therewith by the foot of the driver acting upon the sliding bolt on the foot-board when the frame is being lowered.

When it is desired to adjust the inner end of the platform only, the driver with one hand grasps the handles of both levers K and M, bringing them together. This slides the collar L and disengages the clutches $j^3$ $l^2$, leaving the drum $j^2$ free to revolve on the shaft in either direction under control of the lever K. The rope may then be wound upon or paid off from the drum, raising or lowering the end of the platform, as the necessity of the case may demand, the drum being again locked to the shaft by the driver releasing the lever M and permitting its spring to force the clutch L back into engagement with the drum-clutch.

The inner end of the platform is supported by a grain-wheel, which, on account of its being so far to the rear of the axial line of the main wheel, must be castered to prevent cramping when the machine is turning. In going about the machine turns upon the main wheel as a pivot, or with it, the grain end of the platform swinging backward, and a grain-wheel mounted upon a fixed axle or stud not in line with the main wheel will be dragged sidewise over the ground, while a caster-wheel will be swung round to the position shown by dotted lines in Fig. 1, its axial line radiating from the center of the main wheel, as shown.

Figures 7, 8, 9, 10:
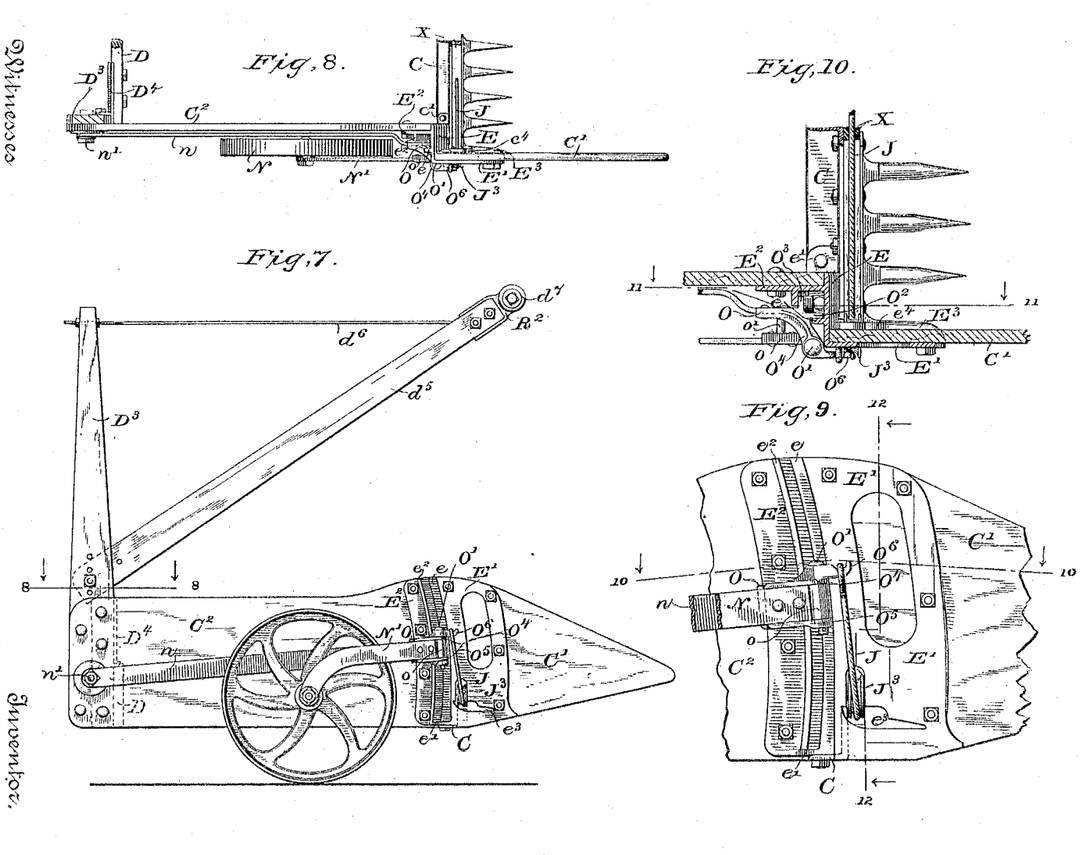
Fig. 7 is a view in elevation of the grain end of the platform, showing the method of mounting the caster-wheel and of supporting the inner end of the reel-shaft.
Fig. 8 is a plan view of the same, partly in section, on the line 8 8 of Fig. 7.
Fig. 9 is a view in elevation as seen from the grain side of the casting or bracket which supports the divider and endboard of the platform and guides the caster-head in the vertical adjustments of the end of the platform.
Fig. 10 is a horizontal section of the same on the line 10 10 of Fig. 9.

The caster-wheel N is supported on a stud-axle on the inner side of the free end of an arm, N', pivoted at O' in a caster head-block, O, which is attached to the front end of a radius-bar, $n$, pivoted at $n'$ near the rear extremity of the end-board of the platform, as clearly shown in Figs. 7 and 8. The breast or central portion of the casting E is curved to a radius struck from the pivotal point $n'$ of the radius-bar and has a correspondingly-curved rib, $e$, projecting from its rear face and extending its length from top to bottom. From the rear portion, $E^2$, of the casting projects a rib, $e^2$, which stands at right angles to the rib $e$, and is curved to correspond therewith. The radius-bar $n$ extends forward from its pivotal point, lying in close proximity to the end-board, until it reaches a point in line with the front of the grain-wheel, where it is offset or bent away from the grain-board and terminates in a socket or recess on the inner face of the head-block O, to which it is suitably secured by bolts or rivets. A projecting flange, $O^2$, on the front of the head-block lies inside of the rib $e$ on the bracket E, while the inner face of the head-block bears lightly against the edge of the rib $e^2$. Another flange, $O^3$, projecting from the inner face of the head-block at right angles to $O^2$, bears lightly against the front face of the rib $e^2$ and serves to relieve the pivot of the radius-bar from excessive backward thrusts and strains. These ribs form a guideway for the head-block, permitting it to vibrate freely up and down, but preventing side motion or the twisting of the radius-bar while the caster-wheel is swinging around to the dotted position shown in Fig. 1.

Figures 28, 29, 30:
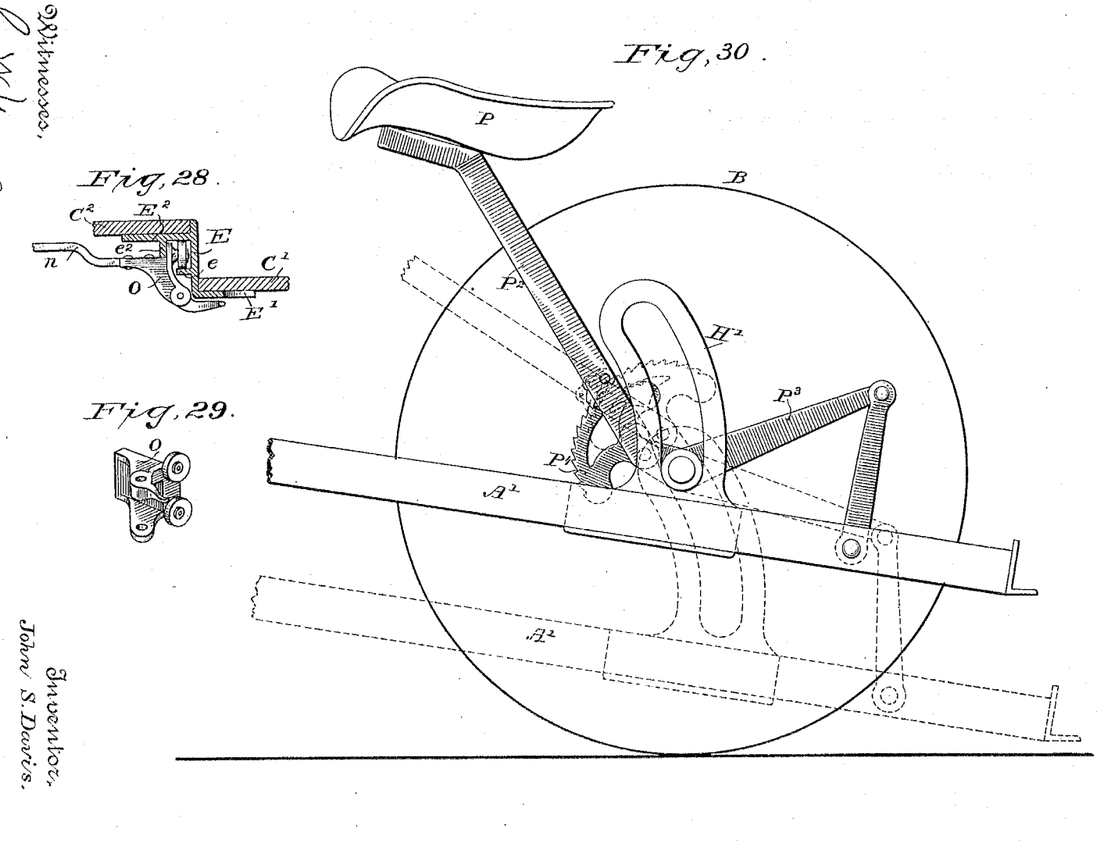
Fig. 28 is a horizontal sectional view through the caster-wheel guide-standard, showing the application of a modified form of the head-block having anti-friction rollers.
Fig. 29 is a perspective view of the head-block detached.
Fig. 30 is a view of a modification of the method of connecting the rear end of the seat standard or lever to the main frame.

A modification of the head-block shown in Figs. 28 and 29 consists in dispensing with the flange $O^2$ and substituting therefor two anti-friction rollers mounted upon studs projecting at top and bottom from the front face of the flange $O^3$. These rollers reduce the friction and enable the driver to adjust the platform even when the caster-wheel stands at a right angle to the end-board, exerting its greatest twisting strain on the radius-bar, tending to bind the head-block in the guideway. Lugs or ears $O^4$ $O^5$ extend outwardly and forward from the top and bottom edges of the head-block and terminate in bosses, through which the pivot-pin O' passes. The upper one of these lugs is ribbed to give it greater strength and has projecting from its front face a hooked spur, $O^6$, to which the wire rope is attached. The arm N', upon which the caster-wheel is mounted, is of wrought-iron and terminates at its front end in a casting, $o$, to which it is securely riveted. This casting lies between the ears $O^4$ $O^5$ of the head-block and is pivoted upon the pin O'. A rope, J, extends from the drum $J^2$, under the immediate control of the driver when in his seat, around the guide-sheave J', mounted in a suitable bracket, $j^4$, securely bolted to the side bar, $a^2$, of the main frame near the finger-beam. From this sheave the rope extends along the front of the finger-beam, resting upon a wooden bar interposed between the guard-fingers and the iron beam. At the grain end of the platform the rope passes around a small guide-sheave, $J^3$, suitably supported in the casting or bracket E', and up to the head-block, engaging the forwardly-projecting hooked spur $O^6$ thereon by a hoop at its end. As will be seen, the weight of the end of the platform is sustained by the wire rope and guide-sheave $J^3$, and its elevation from the ground determined by the amount of cord paid out or wound upon the drum $J^2$.

The flange E' of the bracket, which supports the divider C', is perforated at its bottom, as at $e^3$, for the passage of the cutter-bar at the extremity of its outward stroke, and in an upward extension of this perforation is mounted the guide-sheave $J^3$. A strengthening-rib, $e^4$, on the inner face of the flange follows the irregularities of the aperture and affords a bearing for the pivot of the guide-sheave. The bracket is suitably thickened and shaped on its inner face, near the bottom, to form the end guard-finger, $E^3$, of the series and to properly guide and support the cutter-bar at the extremity of its stroke.

A deflector-bar, $C^3$, attached to the point of the divider, is used to slightly bend in the heads of the grain and prevent its lodging against the offset or breast formed by the main portion E of the bracket; but this acts upon the grain at such a height that it does not materially alter its angle at the cutters.

In order to utilize the driver's weight to assist in the vertical adjustments of the frame and to counterbalance as far as possible the excess of weight of the frame at the rear of the main axle, I so construct the seat-standard that it shall act as a lever, having its fulcrum upon the axle and its point of resistance on the frame at a suitable distance in rear of the axle. The seat P is mounted directly in line with and over the front of the main wheel B, its supporting-standard being made in the form of a yoke, one member of which passes down each side of the driving-wheel, encircling the axle on which it is fulcrumed, and beneath the resistance-points Q, attached to the main frame.

In adjusting the frame vertically on its axle the relative position of the axle upon which the seat-standard is fulcrumed and the points of resistance upon the frame are materially altered, which alteration affects the elevation and angle of the seat relatively to the footboard to such an extent as to render independent adjustment of the seat-standard necessary. I effect this adjustment by dividing the standard at a point near the axle and about midway of its length pivoting the upper portion to the lower one, so that it may be adjusted relatively thereto and held in any desired position by mechanism which may be controlled by the driver.

A downwardly-projecting lug, P', cast to the bottom of the seat, has securely bolted along each of its sides the ends of the flat bars $P^2$, which compose the upper portion of the seat yoke or standard. At the rear end of the lug these bars are bent away from each other and extend in opposite directions until the proper width for the yoke has been obtained, when they are again bent and extend downwardly to a point near the axle. The bars $P^3$, which compose the lower portion of the standard, are curved, as shown in Figs. 4, 5, 6, and 21, in order that they may bear at a proper angle against the rollers which constitute the resistance-points on the main frame in any position to which the frame may be adjusted, and at their upper ends are secured to castings lying in recesses therein and securely bolted thereto. These castings are bored to fit the main shaft, and above it broaden out to form quadrants $P^4$, the edges of which are provided with ratchet-teeth. The bars $P^2$, which constitute the upper members of the seat-standard, are pivoted to these castings just above the axle, and are provided with suitable pawls, $p$, which engage the ratchet-teeth of the quadrants and maintain the seat at any desired position. The pawls will click over the ratchet when the seat is raised, but must be disengaged therefrom when it is lowered.

A rock-shaft, $p'$, is pivoted in the side bars of the yoke at its upper end and close beneath the seat, and is provided at each end with downwardly-projecting arms, which are connected by link-rods $p^2$ to the pawls. A suitable finger-piece or latch, $p^3$, which is secured to the shaft about midway of its length, curves up and over that portion of the yoke-bar which lies in front of it, extending to a point near the front of the seat, where it lies within easy reach of the driver's fingers, and can be operated by the same hand with which he grasps the seat to raise or lower it. It will thus be seen that any desired elevation of the seat may be obtained to compensate for the adjustment of the frame or to suit the tastes of the different drivers, and that by thus mounting the seat-standard on the axle and passing it under the resistance-points considerably in the rear of the axle the driver does not lift his own weight in raising the frame, but, on the contrary, it assists him very materially in this operation, and when the frame is adjusted relieves the sustaining-pawl I of no inconsiderable portion of the weight of the frame, which would otherwise rest wholly upon it.

The resistance-points consist of anti-friction rollers Q, mounted in brackets or stirrups securely bolted to the frame-bars A' $a^2$ of the main frame. One of these stirrups is shown in detail in Figs. 22, 23, and 24. It consists of a base-piece, Q', having overhanging ledges which embrace the adjacent frame-bars and, together with a bolt, $q$, hold it securely in place. Cylindrical bosses $q'$ $q^2$ extend at the top and bottom from the inner face of the base-plate, and upon the upper one of the bosses is fitted the anti-friction roller Q, beneath which the seat-standard bears. These bosses serve as distance-posts, against which a guard-plate, $Q^2$, is secured by rivets which pass through it and the posts, (they being cored out for this purpose,) and it serves not only to keep the anti-friction rollers in place, but forms a strong loop, through which the projecting end of the standard-bar plays, and from which it cannot escape by accidental sidewise movement.

The base-plate has two ribs, $q^3$, on its inner surface, extending from post to post, and at such distance apart as to form a suitable recess between them to receive the head of the retaining-bolt $q$ and prevent it turning when the nut is being screwed up outside of the frame-bar. Instead of these stirrups and anti-friction rollers on the main frame constituting the resistance-points against which the seat-standard or levers bear, it might be connected at its rear end to the frame by a link, which would permit the full range or adjustment of the frame, as shown in Fig. 30.

Figure 3:
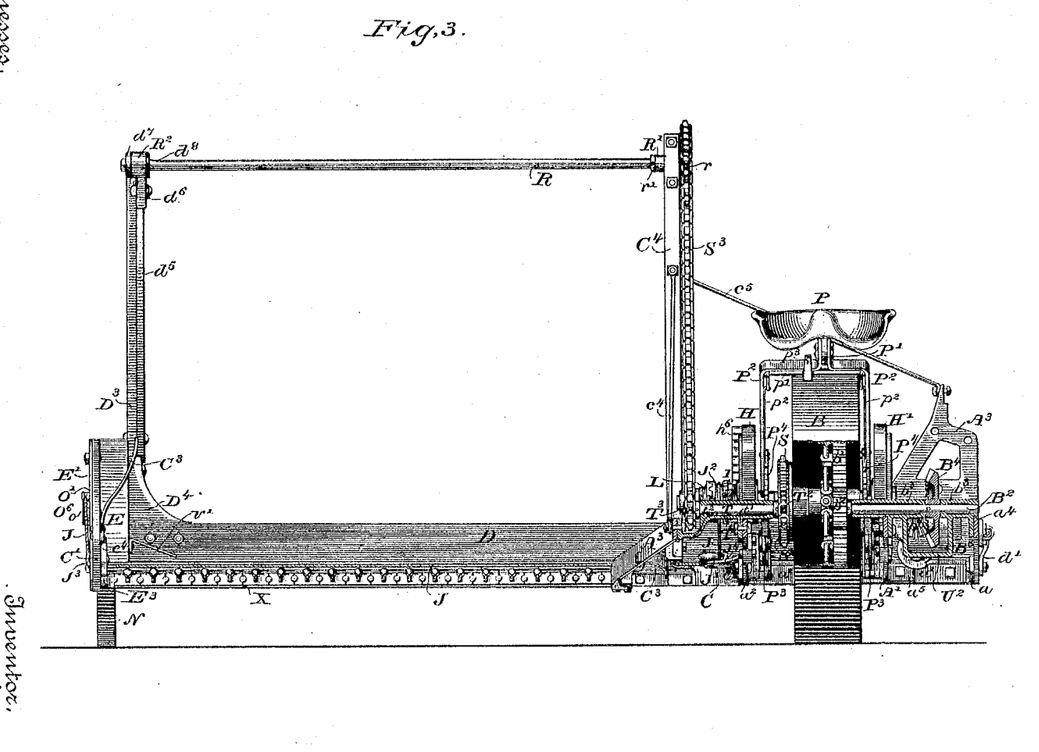
Fig. 3 is a front elevation, partly in section, on the line 3 3 of Fig. 2.

The reel shaft R is supported at its stubble end in a bearing, R', bolted securely to the head of the reel post $C^4$, and its other end, as shown in Figs. 3 and 7, in a bearing, $R^2$, bolted to the head of an overhanging bar, $d^5$, supported by the post $D^3$, near its lower end, by a bolt, which holds them firmly together, the post and the bar having each a series of holes, into any of which the bolt may be passed to effect adjustment of the upper end of the bar. Attached to the upper end of the bar by means of one of the bolts which secure the bearing $R^2$ is a truss-rod, $d^6$, which extends back and passes through an aperture in the head of the post $D^3$. The end of the reel-shaft is tapped for the reception of a bolt which clamps a washer, $d^7$, against the end of the shaft. This washer has a greater diameter than the shaft and its projecting edge bears against the outer face of the journal, preventing endwise movement of the shaft therein in one direction, while a collar, $d^8$, pinned to the shaft at the inner face of the journal, prevents such movements in the other direction. By this arrangement of the brace-bar $d^5$ and truss-rod $d^6$ a very strong vertical support is given to the inner end of the reel-shaft, while the supporting-post $D^3$ is located far enough to the rear of the cutter-bar to effectually prevent the heads of the longest grain from catching thereon. The shaft is held against edgewise movement in the journal $R'$ on the post $C^4$ by the hub of a sprocket-wheel, $r$, and a collar, $r'$, at either side of the journal. The reel is driven by a sprocket-wheel, S, loosely mounted upon the main axle $B'$ between the driving-wheel B and one member of the seat-supporting standard $p^2$. The annular flange composing the rim of the wheel has sprocket-teeth cast on its periphery and ratchet-teeth on its inner surface. A circular plate or disk, $S'$, covers the open face of the sprocket-wheel, and is secured to the hub of the driving-wheel by having its boss shrunk or keyed thereon, and carries upon its inner face a spring-pawl, $s$, which engages the ratchet on the inner face of the rim of the sprocket-wheel, driving it when the machine is going forward, slipping past it when the machine is backing, or being thrown out of engagement with it altogether when it is desired to stop reeling. This clutch corresponds in its essential features and method of operation with those fully shown and set forth in the several Letters Patent of the United States granted to me January 30, 1883, No. 271,430, February 13, 1883, No. 272,377, and April 3, 1883, No. 275,330, and does not, therefore, need elaborate description here to make it plain.

A counter-shaft, T, is supported in axial line with the driving-shaft $B^2$ by an overhanging sleeve or bracket, $T'$, bolted to the frame-bar $a^2$ by its downwardly-projecting foot $t'$, and the brace-bar $A^2$ by a suitable extension and foot, $t^2$, the bolt which passes through the latter connection also serving to hold the brace-rod $c^4$ of the reel-post $C^4$. Upon each end of the shaft T where it projects beyond the sleeve are mounted sprocket-wheels $T^2 T^3$, the former being connected to the sprocket-wheel S by a driving-chain, $S^2$, and the latter to a sprocket-wheel, $r$, on the end of the reel-shaft by a driving-chain, $S^3$. The shaft T being in axial line with the driving-shaft $B^2$, about which the main axle $B'$ moves during the vertical adjustments of the frame, the distance between the sprocket-wheels S and $T^2$ will not vary during these adjustments, and will not, therefore, necessitate any variation in the length of the driving-chain $S^2$.

Figure 1:
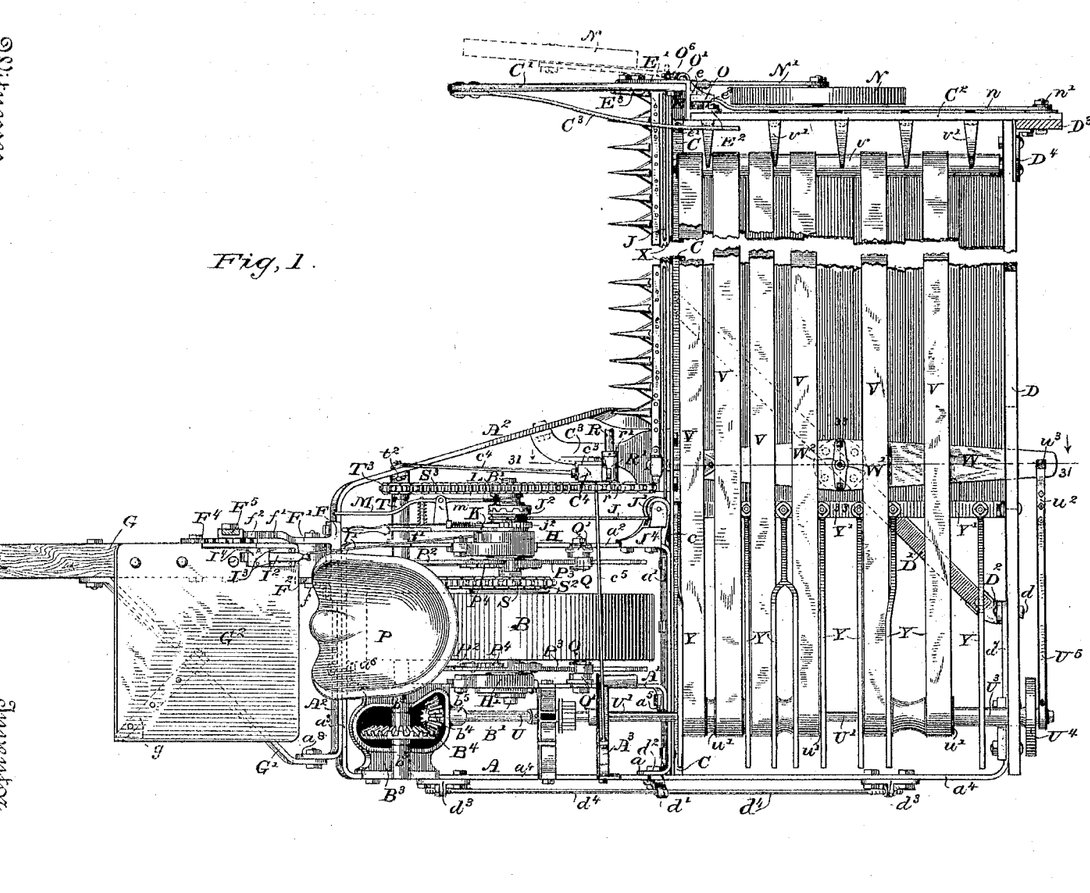
Figure 1 is a plan or top view of a harvester embodying my improvements, the reel shaft and the support for its outer end being broken away.
Figure 2:
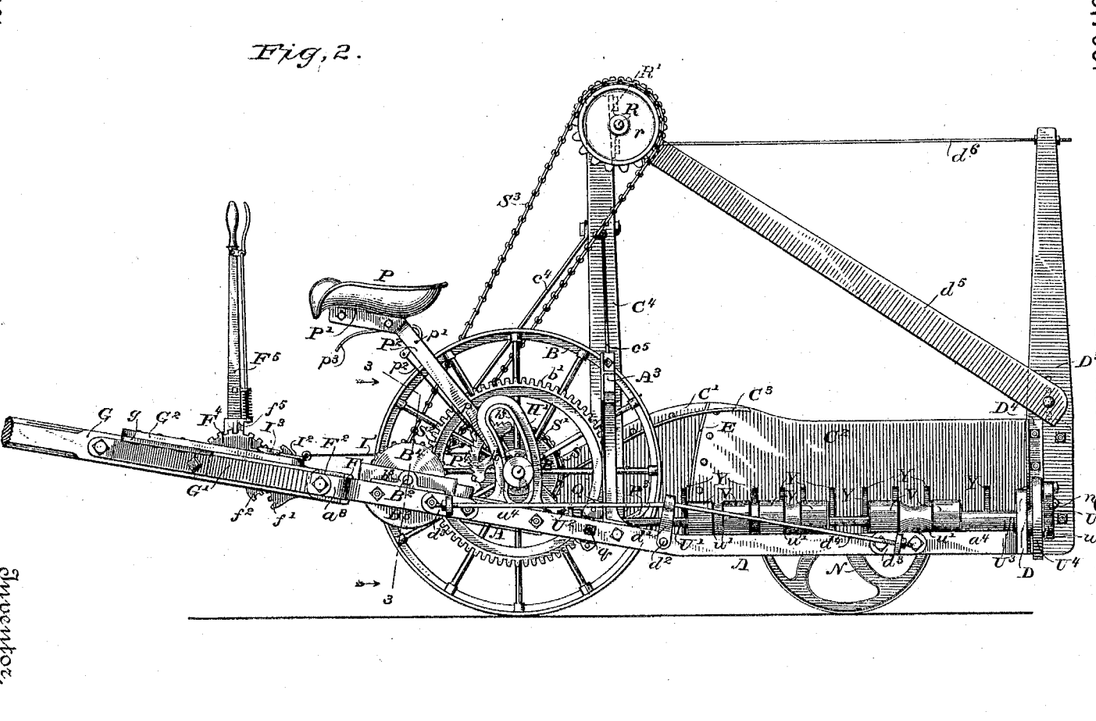
Fig. 2 is a side elevation of the same as seen from the stubble side of the machine.
Figures 4, 25, 26:
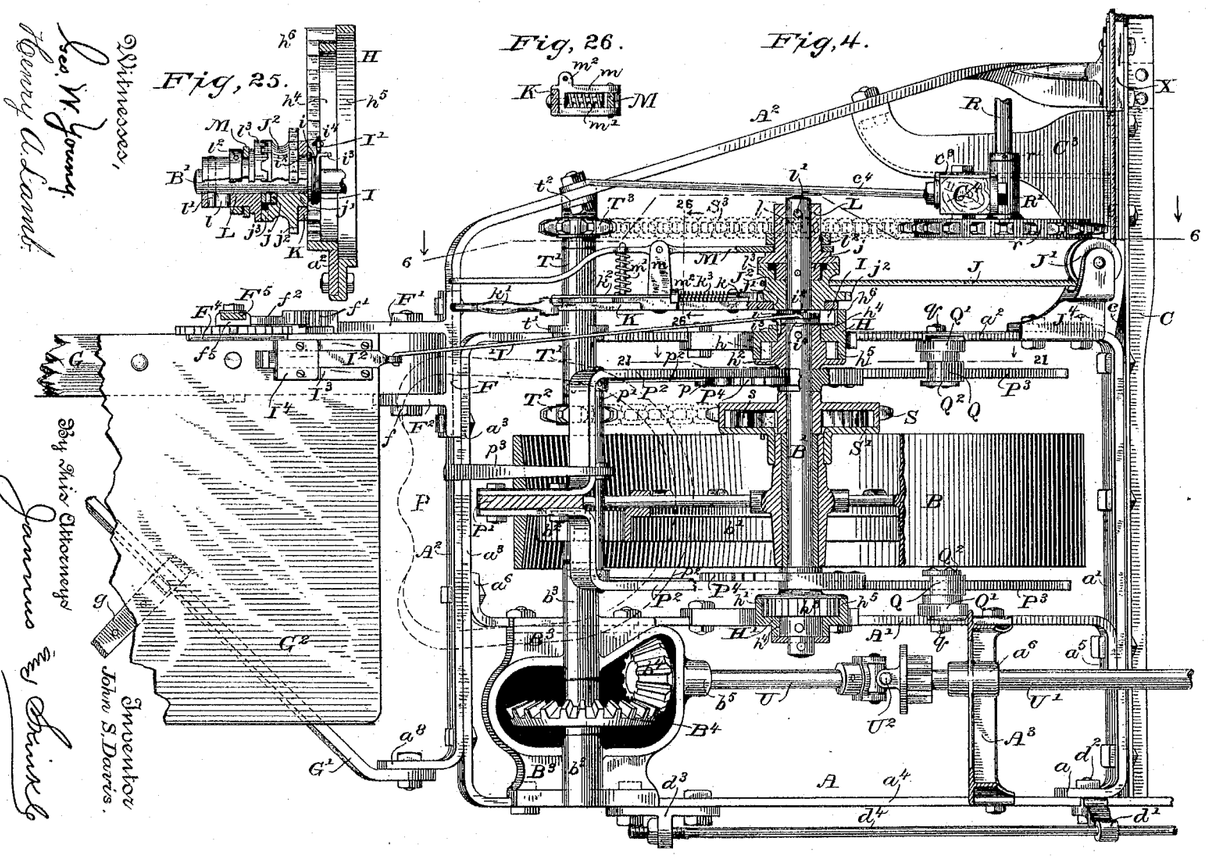
Fig. 4 is a plan view, partly in section, on the line 4 4 of Fig. 5, of the main wheel and that portion of the main frame which surrounds it.
Fig. 25 is a view, partly in elevation and partly in section, of the inner end of the main shaft, having the sustaining - pawls, the winding - drum and its ratchet, the locking-clutch, and the levers by which the drum and clutch are operated shown as mounted thereon and in proper relation to the sustaining rack-yokes.
Fig. 26 is a transverse sectional view on the line 26 26 of Fig. 4 of the lifting-levers.
Figure 5:
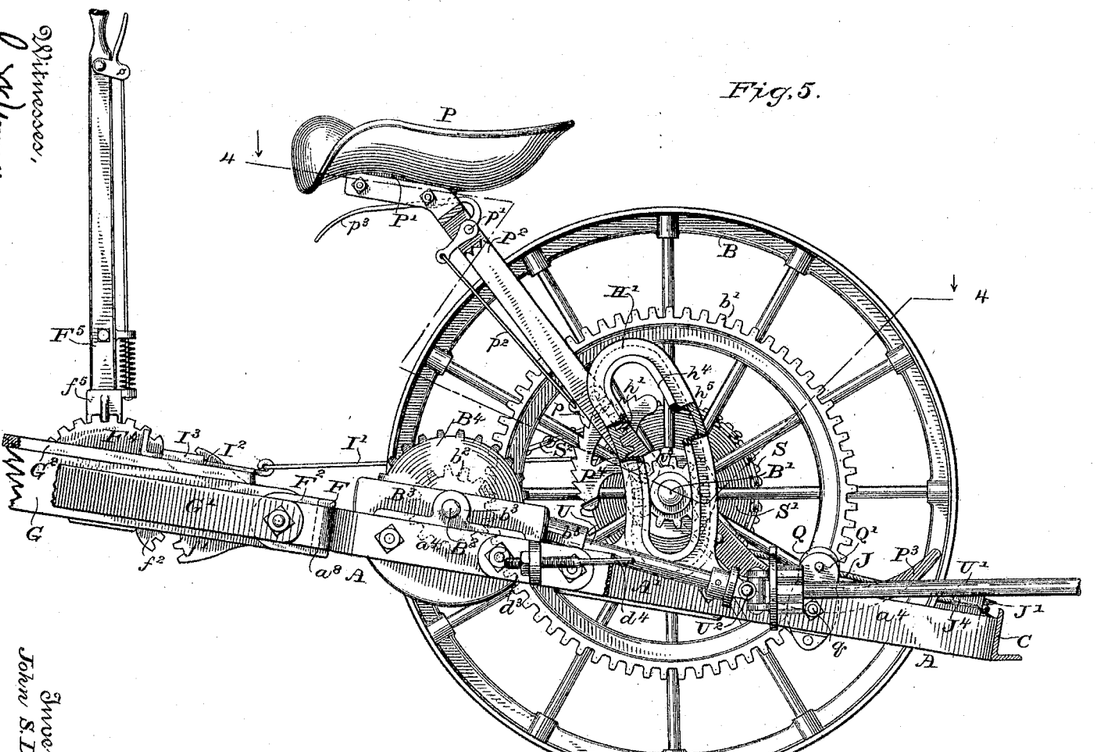
Fig. 5 is an elevation of the same as seen from the stubble side of the machine, some of the parts being shown as broken away and in section for the purpose of better illustration.
Figures 6, 27:
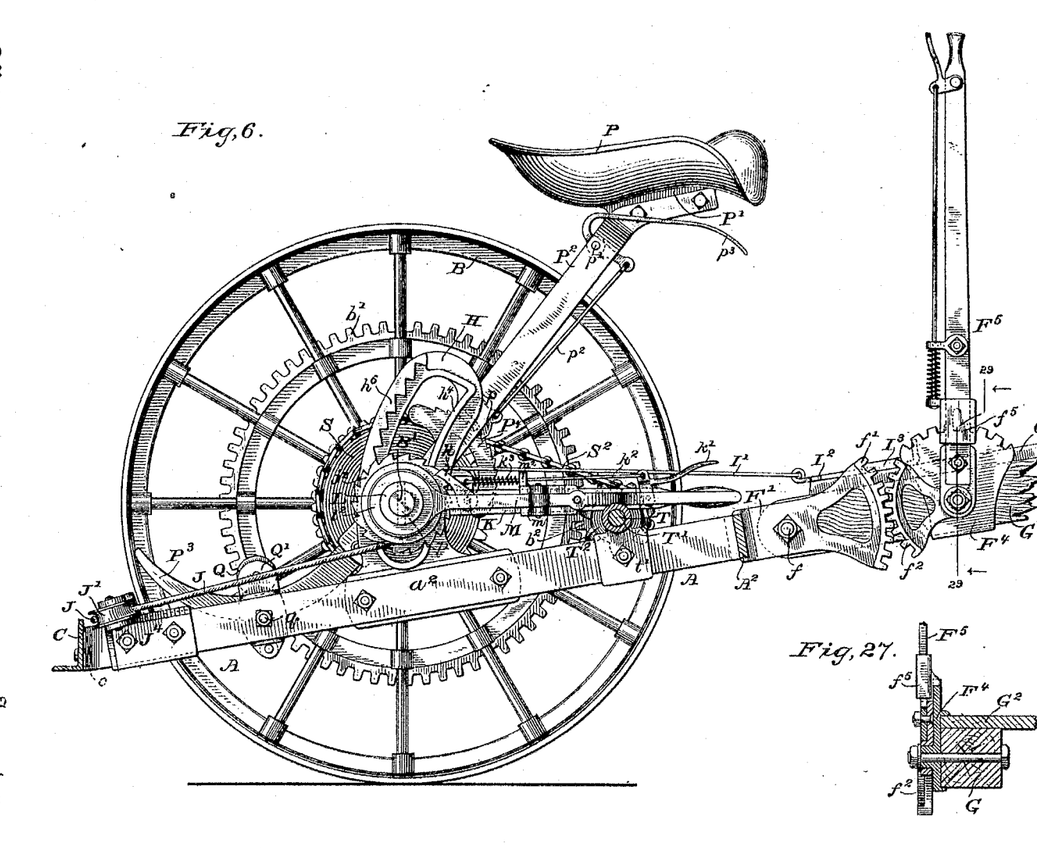
Fig. 6 is an elevation of the opposite or grain side of the same, partly in section, on the line 6 6 of Fig. 4.
Fig. 27 is a detached sectional elevation of the tongue, bracket, and rocking lever mounted thereon.

A bevel-wheel, $B^4$, which may be provided with a backing-ratchet like that described for the reel, is secured on the driving-shaft $B^2$ in the recess of its supporting-bracket and meshes with a bevel-pinion, $b^4$, on the end of the forward section, U, on the line shaft $U'$, which extends to the rear of the platform. The shaft-section U is suitably journaled in a boss, $b^5$, on the bracket $B^3$, and extends at an angle back and down until it reaches the plane of the line-shaft $U'$, to which it is united by a universal coupling-joint, $U^2$, as shown in Figs. 1, 4, and 5. The crank-shaft $U'$ is journaled near its front end in a bearing, $a^6$, formed in the binder-frame casting $A^3$, from which it extends back across the platform in a line parallel thereto, and is journaled at its rear end in a box or bearing, $U^3$, projecting through and bolted to the rear sill of the platform.

The spur-pinion from which the lugs forming part of the universal joints $U^2$ project belongs more particularly to the binding mechanism before referred to, and is only shown here because of its connection with this joint.

At suitable intervals along the shaft $U'$, between the front and rear sills of the platform, are rollers $u'$, around which the carrier-belts V pass and by which they are driven. The rear end of the shaft $U'$ projects through the journal $U^3$ and has secured to it a crank plate or disk, $U^4$, the wrist-pin of which is connected by a pitman, $U^5$, to the end of the sway-bar W. This bar is pivoted to the platform about midway of its length and extends through a slot of sufficient length to permit its vibration in the rear sill, the projecting end being connected to the pitman $U^5$.

The sway-bar W consists of a thin flat bar of wood pivoted about midway of its length on a bracket, $W'$, bolted to the bottom of the platform. This bracket consists of an upright cylindrical boss having a flange or base-plate secured by four bolts to the bottom of the platform, two of the bolts passing through the diagonal brace-bar $D'$, which lies beneath the center of the bracket $W'$, as shown.

Instead of fastening the guard-fingers directly against the upright face of the angle-iron bar C, I interpose between them a wooden bar, X, against which the fingers are fastened, as shown in the drawings.

The wire rope J, by means of which the driver adjusts the grain end of the platform, passes along the front of the platform, lying on the bar X, which, not extending to the top of the iron finger-beam C, leaves a corner or recess, in which the rope lies out of the way of all of the working parts. The carrier-belts V extend the entire length of the platform and pass around a guide-roller, $v$, at its extremity, which may be adjustable to tighten the belts by any of the well-known belt-tightening mechanisms now in use—such, for instance, as those shown and fully described in Letters patent of the United States granted to me January 10, 1883, No. 252,081, and September 25, 1883, No. 285,580.

Guard-fingers $v'$, attached to the end-board of the platform, extend over the space between the roller $v$ and the end-board and prevent the grain from falling through it. These fingers or their equivalents are such as are shown in my patent, No. 285,580, just referred to. Flat bars of iron, Y', extend across and are secured to the front and rear sills and upturned feet on the ends of the bars. These bars support the bottom boards of the platform and help to stiffen the frame. The clearer-fingers Y are bolted to the outer one of these bars below the belts, between which they rise at an easy angle until they reach such an altitude above the belts as will insure the grain being lifted above and out of the influence of the carrier-belts, from which point they extend to the outer edge of the platform in a plane parallel to the top of the belts. These clearer-fingers, however, form part of the binding mechanism before referred to, and they will be more fully shown and described in an application for a patent thereon.

I have described, and shown in the accompanying drawings, several features of my invention which go to make up a complete harvester, but which form no part of this application, and are not herein claimed, as they will constitute or form part of the subject-matter for other applications to be filed hereafter.

What I claim, and desire to secure by Letters Patent, is—

1. The combination of the wheel-frame supported upon the axle of the driving-wheel, and the tongue pivoted to a bracket on the front of the frame, one of the pivot-lugs of said bracket terminating at its front end in a segmental gear-rack, with a rocking lever mounted on the tongue and provided with a segmental gear meshing into the rack on the frame-bracket and a locking-detent taking into a notched rack secured on the tongue, and a driver's seat supported by a standard fulcrumed on the main axle, and which, extending to the rear thereof, engages fixed points on the wheel-frame, substantially as hereinbefore set forth.

2. The combination of the main frame supported by and vertically adjustable upon the axle of a driving-wheel, a ratchet-standard secured to the frame, a spring-pawl pivoted upon the axle and engaging the ratchet, a sliding bolt on the foot-board, and a link-rod connecting the bolt and pawl, substantially as hereinbefore set forth.

3. The combination of the main frame of a harvester supported upon the axle of the driving-wheel and vertically adjustable thereon with a lever fulcrumed upon the axle and connected at one end to the frame and adapted at its other end to receive the weight of the driver, which tends to lift the frame and assist in the operation of vertically adjusting it, substantially as hereinbefore set forth.

4. The combination of the main frame of a harvester, supported upon the axle of the driving-wheel and vertically adjustable thereon, with a driver's seat mounted upon one end of the seat-standard fulcrumed upon the axle, the other end being connected to the frame, substantially as and for the purpose hereinbefore set forth.

5. The combination of the main frame of a harvester, supported upon the axle of a driving-wheel and connected at its rear to the outer front corner of a grain-platform, with a driver's seat located in front of the driving-wheel, and a seat-standard fulcrumed upon the axle and connected at its rear end to the main frame in rear of the axle, substantially as and for the purpose hereinbefore set forth.

6. The combination of a main frame, supported upon the axle of a driving-wheel, with a seat-supporting standard fulcrumed upon the axle and connected at its lower end to the frame, and the upper part vertically adjustable independently of the frame, substantially as hereinbefore set forth.

7. A seat-supporting standard fulcrumed upon the axle of the driving-wheel and connected at its lower end to the frame, the standard being composed of two parts united by a pivot, one part being adjustable relatively to the other, with means for holding it in its adjusted position, substantially as hereinbefore set forth.

8. The combination of a main frame supported upon the axle of a driving-wheel, a driver's seat located immediately over the front of the wheel, and a bifurcated seat-standard pivoted upon the axle at each side of the wheel and connected at its lower ends to the frame, substantially as hereinbefore set forth.

9. A sectional seat-standard the lower part or section of which is pivoted upon the axle and terminates above it in a segmental ratchet, the upper part which carries the seat being pivoted to the lower one at a point above the axle and provided with a pawl which engages the ratchet, and means for holding it out of engagement therewith, substantially as hereinbefore set forth.

10. The combination of a main frame supported by and vertically adjustable upon the axle of a driving-wheel, and a projection or resistance-point on the frame with a seat-standard fulcrumed on the axle and curved at its lower end, which bears against the projection or resistance-point, substantially as and for the purpose hereinbefore set forth.

11. The combination of a segmental ratchet-casting pivoted upon the axle of the driving-wheel and having a projecting lug, to which the lower end or section of the seat-standard is rigidly fastened, with the upper section of the standard pivoted to the casting and provided with a pawl which engages the ratchet, substantially as hereinbefore set forth.

12. A bifurcated seat-standard each member of which is made in two sections, the lower sections being pivoted upon the axle of the driving-wheel and provided with ratchets at their upper ends, the upper sections pivoted to the lower ones and adjustable thereon, and carrying pawls which take into the ratchets, a rock-shaft pivoted between the upper sections, depending-arms on the rock-shaft, link-rods connecting the arms to the pawls, and a finger-lever secured to the rock-shaft and extending forward under the seat, substantially as hereinbefore set forth.

13. The combination of a main frame supported upon the axle of the driving-wheel with a seat-standard fulcrumed upon the axle, its lower curved end passing through a stirrup secured to the main frame and bearing against the roller in the stirrup, substantially as and for the purpose hereinbefore set forth.

14. A resistance block or stirrup for the seat-lever of a harvester, consisting of the base-plate having studs projecting from its ends, a roller mounted upon one of the studs, and a guard-plate secured against the ends of the studs, substantially as hereinbefore set forth.

15. The combination of the axle of a driving-wheel, means for supporting and adjusting the main frame thereon, a winding-drum which controls the adjustment of the grain end of the platform free to revolve on the axle, a lever to revolve the drum, and a sliding clutch to lock the drum to the axle, substantially as hereinbefore set forth.

16. The combination of a winding-drum free to revolve on the axle, a lever to rotate the drum, a sliding clutch to lock the drum to the axle, a lever to operate the clutch pivoted to the drum-lever, and a spring tending to keep the clutches into locking engagement, substantially as hereinbefore set forth.

17. The combination of the main frame of a harvester and a grain-platform attached thereto with mechanism, substantially as described, whereby the driver in his seat and with one hand by means of a single lever and the clutch-shifter carried thereby may effect the vertical adjustment of the main frame and the grain end of the platform on their supports simultaneously, or he may adjust the platform end alone, substantially as hereinbefore set forth.

In testimony whereof I affix my signature in presence of two witnesses.

JOHN S. DAVIS.

Witnesses:
J. H. SOUTHARD,
CARRIE T. SOUTHARD.